United States Patent [19]

Hodgman et al.

[11] Patent Number: 4,546,865
[45] Date of Patent: Oct. 15, 1985

[54] AIRCRAFT ENGINE ACCESSORY UNIT DRIVE

[76] Inventors: John R. Hodgman, 15100 De Vries Rd.; Jack M. Weil, Box 1081, E. Hwy. 12, both of Lodi, Calif. 95240

[21] Appl. No.: 380,287

[22] Filed: May 20, 1982

[51] Int. Cl.⁴ .............................................. F16D 27/04
[52] U.S. Cl. ................ 192/84 C; 192/84 A; 192/115
[58] Field of Search ................ 192/89 B, 84 A, 84 E, 192/84 C, 115, 0.096, 0.098, 48.2, 48.9; 200/32; 244/58; 417/426, 15, 2, 3

[56] References Cited

U.S. PATENT DOCUMENTS

| | | | |
|---|---|---|---|
| 2,112,014 | 3/1938 | Cool | 244/58 |
| 2,401,003 | 5/1946 | Lear | 192/84 C |
| 2,939,340 | 6/1960 | Moore | 192/48.9 |
| 3,249,769 | 5/1966 | Mierendorf | 307/83.5 |
| 3,265,987 | 8/1966 | Hahnel | 331/49 |
| 3,387,689 | 6/1968 | Ovshinsky | 192/84 C |
| 3,547,240 | 12/1970 | Holper | 192/48.2 |
| 3,620,339 | 11/1971 | Becking | 192/84 A |
| 3,723,750 | 3/1973 | Dixon et al. | 307/64 |
| 4,006,807 | 2/1977 | Back | 192/48.9 |
| 4,150,738 | 4/1979 | Sayo et al. | 192/84 C |
| 4,167,695 | 9/1979 | Phillips | 322/12 |
| 4,269,293 | 5/1981 | Martin | 192/67 R X |

Primary Examiner—Rodney H. Bonck
Assistant Examiner—James J. Merek
Attorney, Agent, or Firm—Burns, Doane, Swecker & Mathis

[57] ABSTRACT

Standard aircraft engine accessories like generators, alternators, fuel pumps, vacuum pumps, or air pumps are dually mounted on compact, remotely operable clutch members flanged to standard engine mounting pads for direct engine drive. The clutch member includes complementary mounting pads for such engine mount and has a throughbore for rotatably supporting a pair of journaled shafts respectively carrying, driving and drive clutch plates and power operating means for longitudinally shifting one of the plates to engage the other. One shaft includes a connection for a spool-type safety coupling to drive a spline shaft extending beyond the engine mounting pad to engage an engine driven gear. The other shaft includes complementary connection for a spool-type safety coupling for driving the engine accessory. The clutch body may be used for mounting any (or all) engine accessory power unit or used solely for mounting stand-by or auxiliary (duplicate) power units that need not be run until commanded to do so, either during pre-flight check-out or to replace a non-functioning power unit during flight. The compact, lightweight clutch member, needs no revision of aircraft or engine structure to provide reliable back-up functions for continued operation of an engine during flight without interconnection to other engines or external power sources for such functions (e.g. electrical power). The clutch unit greatly improves both operability and reliability of an aircraft engine during flight. Further, it substantially enhances the safety of air flight, especially in single engine aircraft.

7 Claims, 6 Drawing Figures

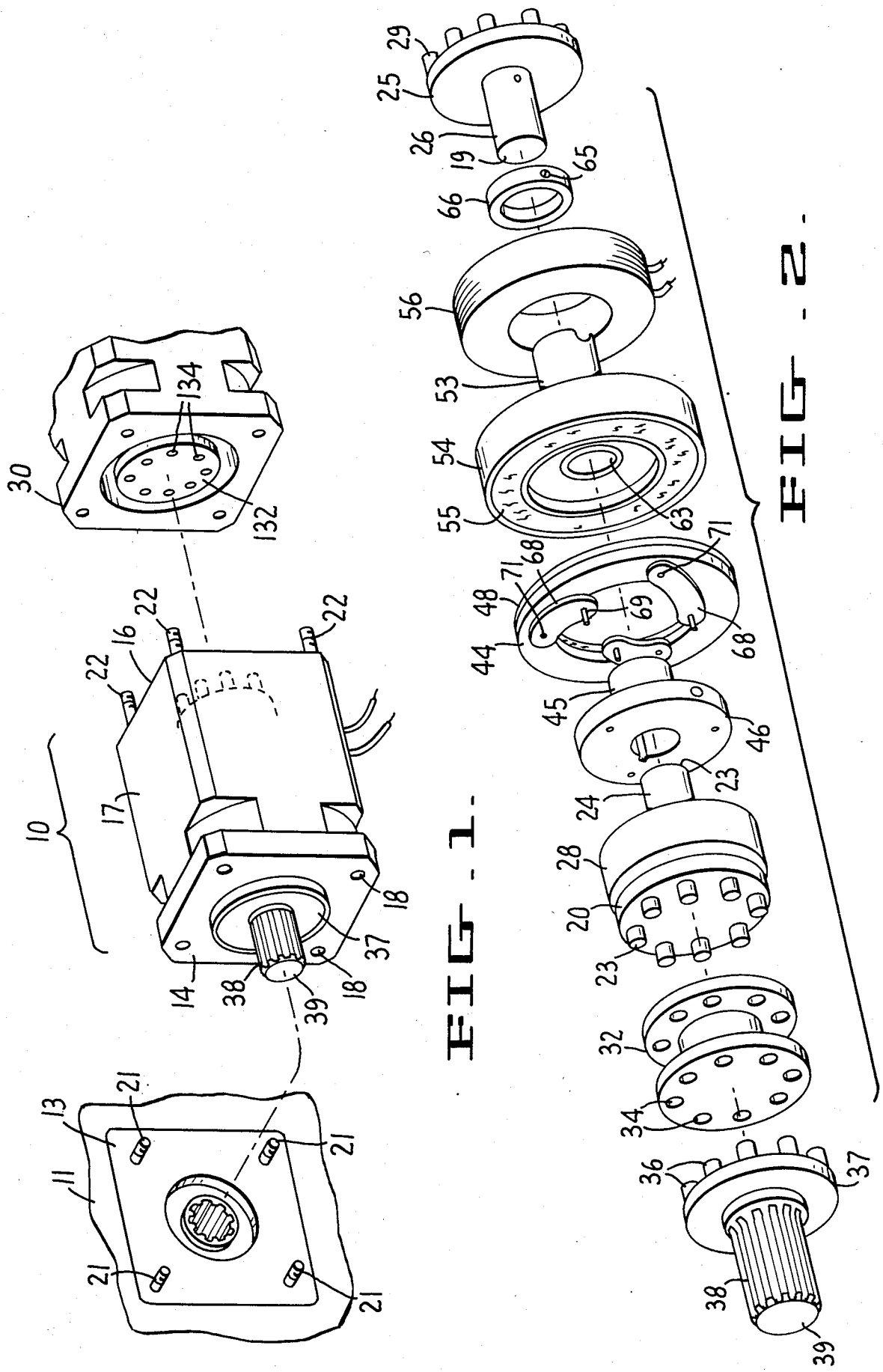

AIRCRAFT ENGINE ACCESSORY UNIT DRIVE

FIELD OF INVENTION

The present invention relates to the drive of aircraft engine accessory power units, such as generators, fuel pumps, vacuum pumps, air pumps, and the like. More particularly it relates to apparatus for driving such accessory power units of an aircraft engine only when required for auxiliary or stand-by operation, rather than continuously, as in present commercial practice.

It is a particular object of the present invention to provide a compact clutch arrangement which adds little weight or bulk to the auxiliary power unit but which makes possible immediate substitution of an auxiliary accessory unit for a primary accessory power unit while an aircraft is in flight. Further, it provides a fully operative stand-by unit which has not consumed engine power to drive it, and which has not undergone severe wear and tear by being continuously driven by the engine.

In accordance with the primary object, the compact clutch unit includes a pair of duplicate mounting pads on each end of a clutch block, positionable between an engine mounting pad and the accessory unit. One of the clutch block pads mounts on the aircraft engine mounting pad. Such engine pad is provided for engagement of a drive gear, or spline, on a generator, alternator, fuel pump, vacuum pump or air pump, or the like, with an engine drive gear. Typically such engine gears drive valve cam shafts, or ignition timing means for an internal combustion engine, or an air compressor for a turbine. The other pad of the clutch block provides a similar standard mount for an auxiliary (as distinguished from primary engine accessory) power unit. A cylindrical bore in the block includes means for supporting journal bearings for a pair of independently rotatable shafts, consisting of a drive shaft and a driven shaft. Each shaft carries a clutch plate having friction elements which are engageable remotely by power means. The power means energizes at least one of the plates to shift axially on its shaft to engage its friction element with that of the other plate. In one form, an annular electrical solenoid or coil surrounds the driven shaft and is closely coupled electromagnetically with the driven clutch plate to axially shift one of the plates to engage the annular friction surfaces. The throughbore of the clutch block supports the solenoid which in turn supports a journal bearing for rotatably mounting said driven shaft. The drive shaft is rotatably mounted in a low friction bearing such as a ball bearing, supported in an axially spaced portion of said bore.

Other power means such as hydraulic, pneumatic or latched mechanical-spring-driven means may be used to engage the clutch plates for direct drive of the auxiliary power unit. The clutch unit may be inserted between the engine and the accessory drive unit in the form of a separate, retrofit unit for mounting any auxiliary unit. Alternatively, it may be incorporated into a slightly elongated end bell of a generator or the accessory unit, for instance, as original or replacement (repair or spare part) aircraft accessory equipment.

BACKGROUND OF THE INVENTION

Aircraft engines normally have double accessories for each necessary function of the engine. For example, an aircraft internal combustion piston driven engine usually includes two ignition systems, two carburetors, two generators, two fuel pumps, etc. Similarly, turbine engines, such as those used for turboprop on jet propulsion, include duplicate accessory units continuously driven by the engine, such as electric alternators or generators, vacuum pumps, hydraulic pumps and the like. Normally only one of the two units is used to operate the engine, but an auxiliary unit is essential if a primary accessory unit fails in flight. Accordingly, it is the practice of industry to drive both the primary and auxiliary units at the same time. Such full time operation of both units frequently results in the auxiliary unit being worn out or broken (since it runs just as long as the primary unit) just when it is most needed.

It has been proposed, as in U.S. Pat. No. 4,167,695—Phillips to provide a decoupling arrangement to disconnect an aircraft engine electrical generator if the unit fails mechanically or electrically in flight. The patent discloses a specially constructed drive shaft which is mechanically disengageable by an electric latching solenoid. Such construction requires replacement of a conventional generator with a unit having a larger diameter shaft internal to the generator rotor. Such space is frequently not available and replacement of such special units would limit interchangeability for replacement by a spare part, and the like. Further, no means for selective immediate remote engagement and disengagement of the auxiliary unit during operation is available.

Electrical systems for transferring load between two separate operative electrical power systems are known as shown in U.S. Pat. No. 3,249,769—Mierendorf, U.S. Pat. No. 3,265,987—Hahnel, U.S. patent Reinert, et al., and U.S. Pat. No. 3,723,750—Dixon, et al. However, none of these contemplate a compact clutch mounting means for selectively engaging or disengaging a friction clutch to operate stand-by or auxiliary aircraft engine accessory power equipment upon demand. Further, none of the prior art discloses a concept of making available to an aircraft pilot, during flight, the ability to engage any of several standard accessories needed for continued operation of an engine, with reasonable assurance that such accessory is not broken or worn out by continuous drive of the unit by the engine, whether or not in use. Additionally, little or no modification of the limited space available on the aircraft engine, or its mounting within a nacelle, is required by the compactness of the mounting clutch, and no modification of a standard accessory for such an engine is required to so mount it on the mounting clutch.

Further, it is now common practice, particularly in single engine aircraft, to provide the engine with two or more standard mounting pads, designated as A.N.D. 20000, for mounting auxiliary or stand-by accessories. In this way an auxiliary generator and an auxiliary vacuum or air pump are mounted for direct drive by the engine at the same time that the engine is driving the main engine generator, pumps, etc. Where such mounting pads are standard, the engine nacelle is normally configured to permit the auxiliary units to be installed or replaced without modification or disassembly of other parts of the aircraft or engine.

SUMMARY OF THE INVENTION

In accordance with the present invention standard engine accessories for aircraft engines, such as generators, alternators, fuel pumps, vacuum pumps or air pumps, are dually mounted on compact, remotely operable clutch members flanged to standard engine mounting pads, such as a conventional A.N.D. 20000, for direct engine drive. The clutch member includes a pair of complementary mounting pads for such engine mount and has a throughbore for rotatably supporting a pair of journaled shafts respectively carrying, driving and driven clutch plates and power operating means for longitudinally shifting one of the plates to engage the other. One of the shafts includes a connecting means for a spool-type safety coupling to drive a spline shaft extending beyond the engine mounting pad to engage an engine driven gear. The other shaft includes complementary connecting means for a spool-type safety coupling for driving the engine accessory. Such clutch body, accordingly, may be used for mounting any (or all) engine accessory power unit or used solely for mounting stand-by or auxiliary (duplicate) power units that need not be run until commanded to do so, either during pre-flight check-out or to replace a non-functioning power unit during flight. By using such compact, lightweight clutch member, no revision of aircraft or engine structure is required to provide reliable back-up functions for continued operation of an engine during flight without interconnection to other engines or external power sources for such functions (e.g. electrical power). Such clutch unit greatly improves both operability and reliability of an aircraft engine during flight. Further, it substantially enhances the safety of air flight, especially in single engine aircraft.

Further object and advantages of the present invention will become apparent from the following detailed description of the preferred embodiments taken in conjunction with the accompanying drawings which form an integral part of the present specification.

BRIEF DESCRIPTION OF THE DRAWINGS

FIG. 1 is an assembled, perspective view of a compact aircraft engine accessory power unit mounting clutch, in accordance with our invention.

FIG. 2 is an expanded perspective view of the internal elements housed in the body throughbore of a mounting clutch assembly shown in FIG. 1.

DESCRIPTION OF THE PREFERRED EMBODIMENT

Figure 3:
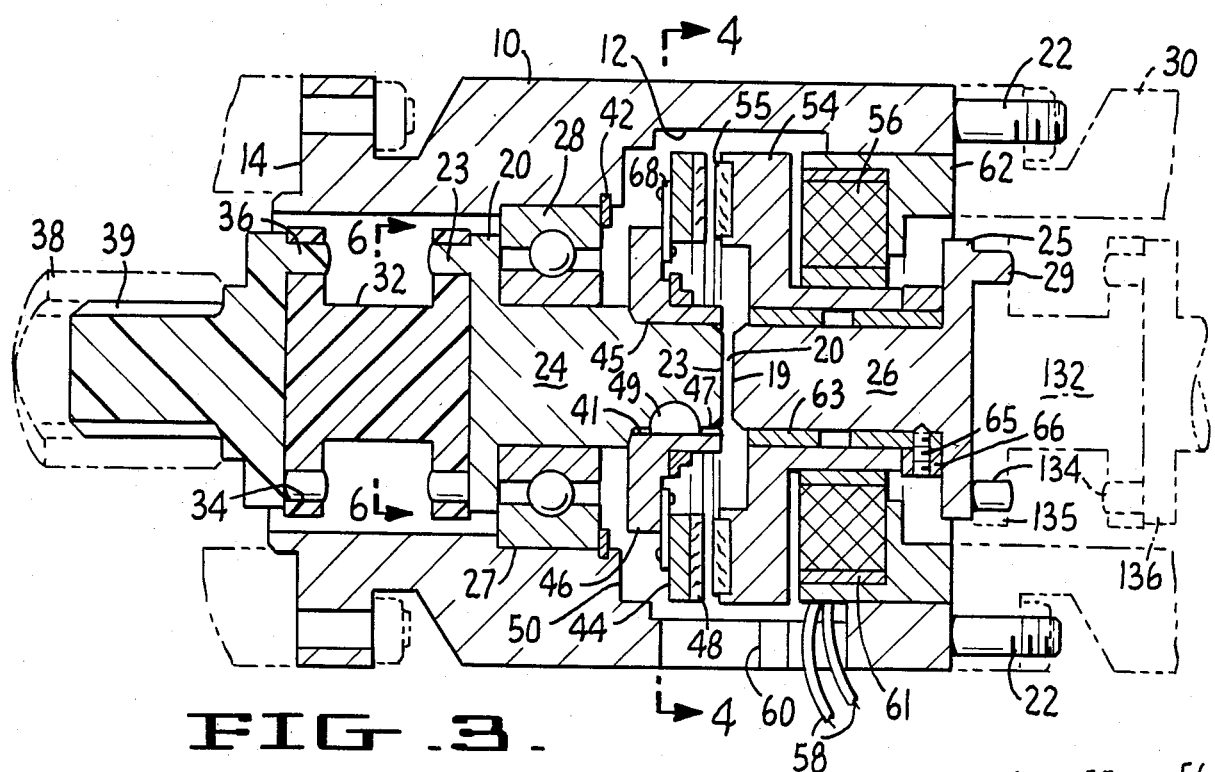
FIG. 3 is an elevation cross-sectional view through the mounting clutch showing assembly of the elements shown in FIG. 2 within the throubhbore of the clutch body shown in FIG. 2.

Referring now to the drawings and in particular to FIGS. 1 and 3, there is shown an aircraft engine accessory mounting clutch unit constructed in accordance with the present invention. In this assembly, clutch body 10 comprises a relatively compact body 17 enclosing the clutch unit 10 adapted to permit unit 10 to be mounted directly on an aircraft engine or a frame assembly 11, a portion of which is shown in FIG. 1. Frame 11 includes a mounting pad 13 having a plurality of spaced apart studs 21 for accepting engine accessory drive unit 17. Normally the engine accessory, such as that indicated as 30 in FIG. 1, is mounted directly on the studs 21 and secured as by way of nuts (not shown) directly to the aircraft engine so that the accessory is continuously driven, so long as the engine is in operation. As will be described later, the actual drive of the rotor of accessory 30 is through a plastic coupling in the form of a spool 32 having a plurality of holes 34, in this case eight in number. To drive coupling spool 32, holes 34, in turn, engage a similar number of studs 36 carried by a drive plate member 37, such as that shown at the left end of the exploded view of rotating elements shown in FIG. 2. In such a conventional, continuous drive of accessory 30, without benefit of clutch unit 17 provided by the present invention, drive plate 37 is driven by a spline means which includes plastic gear 38 carried by shaft 39 formed as an integral part of drive plate 37.

As indicated in FIG. 1, drive spline 38 engages a gear driven continuously by aircraft engine 11, as for example through the timing gear, or the valve-operating cam shaft gear, or as in the case of a turbine engine, of the gears in the air compressor gear train.

As particularly distinguished from the prior art, wherein an engine accessory, such as auxiliary or stand-by generator 30, is continuously driven with the engine, auxiliary unit 30 (irrespective of whether it is in use or not), of the present invention provides a remotely actuable clutch unit 10 which is compact in configuration and fully compatible with standard accessory drive mounting arrangement such as pad 13 and studs 21 used in present commercial aircraft engine installations. It will be understood that each aircraft engine carries several such mounting pads and these mounting pads are used for mounting dual generators or alternators, (depending upon whether the electrical system is DC or AC), fuel pumps or vacuum pumps, hydraulic pumps and the like. Normally the aircraft engine will include two units of each accessory so that upon failure of one, the engine may continue to operate on the other unit. However, as indicated before, if the auxiliary accessory, such as the second generator, has been operating as long as the main accessory unit, the possibility is great that the generator bearings may be worn out or the shaft broken since its running time may be equal to or greater than that of the main accessory. Sometimes the auxiliary unit time may be greater because it was not replaced when the main unit is replaced, accordingly the auxiliary may be even less likely to be operative when the main accessory goes out. Such inoperability is particularly possible with the plastic drive spools, such as 32, now commonly used as the standard form of drive between the accessory and the engine. Failure of these units, as by shearing under torque, can occur simply by unusual drag or starting torque on the accessory and if operability is not regularly checked during preflight check or regular maintenance of the engine, may have occurred without coming to anyone's attention. Such a failure is possible particularly with private aircraft, where single engine airplanes are common. Obviously with single engine airplanes, failure of any accessory is a more critical problem than in multi-engine aircraft generally used in commercial aviation. Accordingly, the present compact clutch body with remote operability of the clutch member to engage or disengage the auxiliary unit provides an unused and unworn generator, fuel pump or the like available to the aircraft at any time during its operation, and in particular during flight. For the purpose of using such units either as standard equipment with any new installation, or as a retrofit on any present aircraft engine, it is essential that the body 10 of clutch unit be of no greater dimensions than the area of mounting pad 13 and as compact longitudinally or axially as possible, so that no rebuilding of the engine nacelle, or the engine itself is needed.

In furtherance of such objectives clutch body 10 includes a throughbore 12 (best seen in FIG. 3) which provides a stepped assembly of generally increasing bore diameters from left to right, as viewed in FIG. 3. Such stepped bores permit easy machining of the body block 10 and provide journal bearing supports for a pair of shafts, indicated as 24 and 26. In the assembled view as seen in FIG. 3, shaft 24 is directly driven in the same manner as if auxiliary unit 30 were directly connected to conventional plastic coupling spool 32, for direct drive by plate 36 through gear 38 and shaft 39 to the aircraft engine. Shaft 24 is rotatably mounted in ball bearing 27, which is pressed into land 28 of bore 12 and held by retaining ring 42. In this way shaft 24 becomes the drive shaft for the auxiliary or stand-by power unit through clutch disc 44 axially moveable with support flange 46 along shaft 24 through keyway 47 on flange 46 engaging Woodruff key 49 in shaft 24. To provide maximum radial dimension to drive face 48, bore 12 includes an undereamed section 50.

In the present embodiment disc clutch plate 44 is arranged to be shifted axially along shaft 24 with flange or hub 46 by an electromagnetic circuit which includes electromagnetic solenoid 56, journal support collar or bearing sleeve 52, driven shaft 26, and rotating clutch member 54. Solenoid 56 is, of course, operated by an electrical circuit indicated generally by the two wires 58 passing through transverse bore 60 in clutch body 10. Solenoid 56 is mounted within bore 12 by an annular or ring collar 62 into which outer ring 61 of solenoid 56 is press-fitted. Bearing sleeve 52 is similarly press-fitted on an inner support ring 64 for coil 56. In this closed magnetic circuit arrangement it is, of course, important that the ends 23 and 25 of shafts 24 and 26 respectively have a minimum air gap 20 therebetween. In this way the magnetic circuit may be completed so that when solenoid 56 is activated and clutch plate 44 is pulled toward clutch plate 54, and thus, friction surface 48 of clutch 44 firmly engages the friction disc 55 of plate 54.

Figure 4:
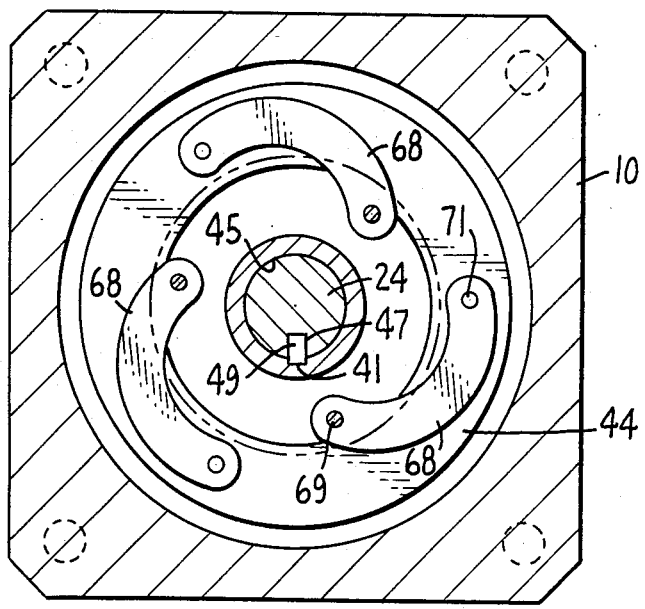
FIG. 4 is a view taken in the direction of arrows 4—4 in FIG. 3, showing details of the drive clutch disc.
Figure 5:
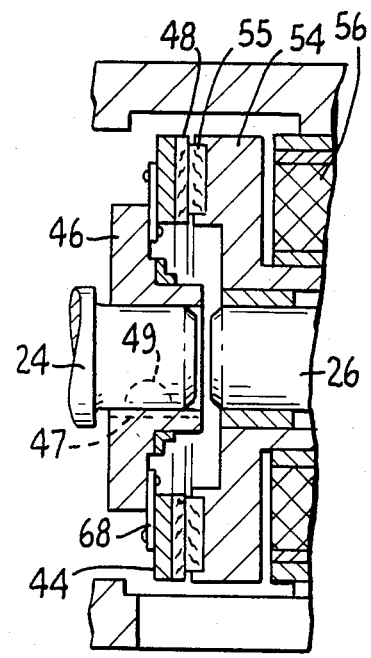
FIG. 5 is a partial cross-sectional view of the clutch disc portions of the assembly shown in FIG. 3, illustrating engagement of the drive and driven clutch discs upon actuation of the power connecting means.
Figure 6:
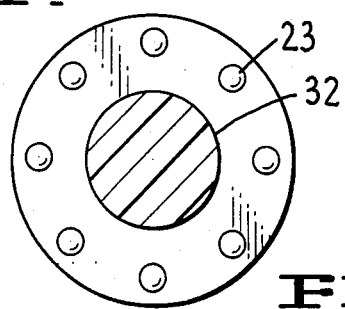
FIG. 6 is a view taken in the direction of arrows 6—6 in FIG. 5 showing one end of a drive-spool safety-coupling used to connect the clutch shafts respectively to the engine drive spline and to the engine accessory power unit.

FIGS. 4 and 5 illustrate in greater detail the construction and operation of shifting clutch plate 44. As indicated, plate 44 is carried on shaft 24 by collar 45 of flange on hub 46. Drive between hub 46 and plate 44 is through keyway 47 and key 49, also shown in FIG. 4. Operation of plate 44 is facilitated by three equally spaced anti-backlash springs 68. As indicated, one end of each of the springs is held by a pin 69, engaging hub 46. The other end is held by a pin 71 that engages clutch plate 44.

FIG. 5 particularly illustrates the operation of the clutch plate through anti-backlash springs 68 and further shows engagement of drive discs 48 and 55, carried respectively by drive shaft 24 and driven shaft 26.

With regard to the materials of construction of the particular compact auxiliary clutch body, it is important, of course, that the unit be lightweight because of its installation in aircraft. Accordingly the body chamber 10 is preferably formed of aluminum. However, because aluminum is a poor magnetic conductor, it is essential that the magnetic structure through shafts 26 and 24, hub 41 of flange 46, clutch plate 44, clutch member 54 including hub 51 be of reasonably good magnetic characteristics so that a strong magnetic field can be established by solenoid 56 using a small amount of current. For this purpose sleeve 52 forms a journal bearing and supports shaft 26 through hub 51. Sleeve 52 is desirably made of copper or the like, so that it will transmit the electromagnetic field but not interfere with operation of the magnetic circuit through rotatating hub 51 of clutch member 54. Member 54 directly engages drive shaft 26 and is held thereon by set screw 65 tapped through thrust ring 66.

From the foregoing description it will be seen that the compact clutch auxiliary drive unit provides a direct mount through parallel faces 14 and 16 each of which corresponds to mounting plate 13 on the aircraft engine. And by virtue of faces 14 and 16 being parallel, an accessory unit 30 may be mounted directly on the clutch body as by through studs 22 and secured thereto by nuts (not shown) so that the entire assembly of the accessory unit on the engine is only a few inches longer than the auxiliary unit itself. Such an elongation of the auxiliary unit without interference laterally makes a particularly desirable installation since, in general, such units are arranged to be mounted and dismounted without disassembly of the rest of the engine or other power accessories for such replacement. Drive of unit 30 by power clutch assembly 17 is through another plastic drive spool 132 having holes 134 and each of its drive faces 135 and 136 for engage drive pins 29 on plate 25 of shaft 26.

While the foregoing embodiment has been described, particularly in connection with an aircraft generator as noted before, the clutch arrangement is equally useful and important in the operation of other engine power accessories, such as vacuum pumps, pneumatic pumps, fuel pumps, hydraulic power units, and the like. Further the system has been illustrated in terms of an electromagnetically actuated discs which is a particularly desirable operating means for aircraft engine, and especially in conjunction with generators. However it is to be understood that other hydraulic or pneumatic operating means can be used in conjunction with the present assembly without departing from the invention. Specifically, a mechanically actuated clutch member which may be energized electrically or hydraulically to release a latch, with the clutch plates being biased toward each other by spring means 20 latch or unlatch the clutch means to drive the auxiliary unit the driven clutch plate is held stationary until such time as the remote actuator releases a latch to permit the rotating clutch plate to be driven by the spring into an engaged position and thereby drive the stationary shaft and the auxiliary unit.

While not illustrated in detail, it will be understood, of course, that the present arrangement of remotely operated clutch plates can be actuated by simple switch mechanisms in the cockpit of the airplane, or checked as to operability by local switch means in the engine nacelle to determine that the clutch is operating and the auxiliary unit is capable of performing its function in flight. Such check can be made either as a routine preflight operation or at normal engine servicing periods.

Further, it will be understood that with a compact lightweight mounting of the present arrangement, any accessory unit can be mounted on an aircraft engine by using our clutch body so that such unit will be driven by the engine only when required for normal operation of the engine.

Various modifications and changes will occur to those skilled in the art from the disclosure of the clutch body of the present invention. All such modifications and changes coming within the scope of the appended claims are intended to be included therein.

What is claimed is:

1. A clutch and mounting assembly for connection between an aircraft engine accessory such as an alternator, a generator, a fuel pump, or the like, and an engine mounting pad to which the engine accessory could also be directly connected, the clutch and mounting assembly comprising:

a body member having a pair of substantially parallel mounting surfaces, one of said mounting surfaces being substantially identical to a mounting pad of the engine and being adapted for connection to the accessory, the other one of said mounting surfaces being substantially identical to an end surface of an accessory and being adapted for connection to a mounting pad of the engine, so that the body member can be inserted between an accessory and a mounting pad; and clutch means in said body member including a first member engageable with a mounting pad, a second member engageable with an accessory, the clutch means being operable for selectively providing driving engagement between the first and second members.

2. A clutch and mounting assembly for an aircraft engine accessory such as an alternator, a generator, fuel pump, or the like, which accessory has a mounting pad and which assembly is designed to be mounted to an aircraft engine mounting pad, the clutch and mounting assembly comprising:

a body member having a cylindrical chamber formed therethrough;

a pair of mounting surfaces transverse to said cylindrical chamber, said mounting surfaces being substantially parallel, one of said mounting surfaces being substantially identical to a mounting pad of an engine accessory and one of said mounting surfaces being substantially identical to a corresponding mounting pad of an aircraft engine, said identical parallel mounting pads being disposed at opposite ends of said chamber so that the body member can be inserted between an accessory and a mounting pad;

means for securing one of said parallel pads to an aircraft engine mounting pad, the other of said parallel pads including means for mounting an engine accessory;

a pair of shafts independently supported for rotation within said chamber, the outer end of each shaft including a drive flange having a plurality of drive pins extending outwardly for connection to a drive spool, one of said drive spools being connectable to an engine drive spline, a clutch plate mounted on the inner end of each of said shafts, each plate carrying a friction member, one of said plates being axially movable on its shaft for engagement with the other of said plates;

bearing means supported directly in one end of said chamber for rotatably mounting one of said shafts;

annular power means supported in the outer end of said chamber, bearing means supported by the inner diameter of said annular power means for rotatably mounting the other of said shafts, and means for operating said annular power means;

said annular power means including means for exerting axial force on said axially moveable clutch plate in response to said operating means;

whereby said clutch plates may be engaged or disengaged to selectively drive an aircraft engine accessory in response to actuation of said annular power means.

3. A mounting clutch assembly in accordance with claim 1 wherein said annular power means is an electromagnetic solenoid and said means for exerting an axial force on said movable clutch plate is a magnetic circuit including said pair of rotatable shafts, said bearing of means within said solenoid and said clutch plates.

4. A mounting clutch assembly in accordance with claim 1 wherein said axially moveable clutch plate includes a plurality of back-lash spring means between said clutch plate and its rotating support shaft.

5. In an aircraft power plant having a plurality of mounting pads for supporting power accessories, such as generators, alternators, fluid pumps and the like, the improvement comprising:

a clutch and mounting assembly for selectively driving such an accessory only when required for operation of said power plant so that unnecessary wear, tear and breakage of said accessory is avoided, said mounting assembly including:

a body member having an outer periphery substantially the same as said power plant mounting pad, a pair of parallel end surfaces at opposite ends of said body member, one of said end surfaces being constructed and arranged to mate with one of the mounting pads, the other of said end surfaces constructed and arranged to mate with an accessory which ordinarily mates to that mounting pad, a through bore in said body member whose axis is perpendicular to said parallel end surfaces, the body member being insertable between the mounting pad and the accessory;

said bore having a series of steps of progressively increasing diameters, a first shaft including a drive flange positioned in the smallest diameter of said bore, a journal bearing means for supporting the axial center of said first shaft in the adjacent step of said bore, a clutch plate supported for rotation on the other end of said first shaft, said clutch plate being within the next adjacent portion of said bore, a second shaft including a drive flange extending axially toward the other end of said bore, a clutch plate on the inner end of said second shaft, bearing support means for said second shaft between said clutch plate and said drive flange, said bearing support including sleeve means within an annular solenoid means mounted adjacent the end of said bore and having the greatest diameter, said annular solenoid means including electrical circuit means for energizing said solenoid means upon demand, said annular solenoid being electromagnetically coupled through said sleeve, said shaft and clutch plate of said second shaft to said first shaft and said first shaft clutch plate to exert an axial magnetic force to one of said plates to thereby engage the driving faces of said plates upon command to couple a non-rotating power plant accessory to said power plant through said clutch plates and said shafts.

6. The aircraft power plant of claim 4 having plural sets of redundant accessories in which one accessory of each set of said redundant accessories is mounted on said engine through a separate mounting clutch.

7. A method of operating duplicate aircraft engine accessories adapted to be driven in synchronism with said engine to assure that at least one of said duplicate units is continuously operable with said engine which method comprises mounting both of said duplicative units on said engine for synchronous drive by said engine, attaching a mounting clutch assembly to the engine having a mounting surface on one end duplicating the mounting surface of said accessories for direct mounting on said engine, the side walls of said mounting clutch being an axial extension of said mounting area, the other end of said mounting clutch having a mounting surface duplicating the mounting surface for said accessory on said engine, and an axially moveable clutch within said mounting clutch, said clutch including a driving member and a driven member and an axial force generating means, securing one of said duplicate units directly to the mounting clutch assembly such that the driving clutch member is continuously driven in synchronism with said engine and the driven clutch member is directly coupled to said engine accessory, and selectively engaging said mounting clutch to couple said driven clutch member to said driving clutch member only when required for continued operation of said engine or for checking its operability for such service.

* * * * *